(12) United States Patent
Cruble

(10) Patent No.: US 12,519,262 B2
(45) Date of Patent: Jan. 6, 2026

(54) PROTECTIVE CAP-EQUIPPED TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Thomas Cruble, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 289 days.

(21) Appl. No.: 18/282,784

(22) PCT Filed: Mar. 14, 2022

(86) PCT No.: PCT/JP2022/011387
§ 371 (c)(1),
(2) Date: Sep. 18, 2023

(87) PCT Pub. No.: WO2022/202447
PCT Pub. Date: Sep. 29, 2022

(65) Prior Publication Data
US 2024/0170876 A1    May 23, 2024

(30) Foreign Application Priority Data
Mar. 26, 2021   (JP) ................. 2021-052705

(51) Int. Cl.
*H01R 13/40*      (2006.01)

(52) U.S. Cl.
CPC .................. *H01R 13/40* (2013.01)

(58) Field of Classification Search
CPC ........ H01R 13/44; H01R 13/04; H01R 13/40
(Continued)

(56) References Cited

U.S. PATENT DOCUMENTS

2016/0064849 A1   3/2016   Eckel
2016/0093970 A1   3/2016   Wu et al.
(Continued)

FOREIGN PATENT DOCUMENTS

JP    S58-147180 U1   10/1983
JP    2022-061073 A    4/2022

OTHER PUBLICATIONS

International Search Report issued on May 31, 2022 for WO 2022/202447 A1 (6 pages).

*Primary Examiner* — Tulsidas C Patel
*Assistant Examiner* — Jeffrey Mountain
(74) *Attorney, Agent, or Firm* — Venjuris, P.C.

(57) ABSTRACT

A connecting portion of the terminal has a projecting end surface and a pair of side surfaces, facing each other in a second direction serving as a plate width direction orthogonal to a first direction serving as a plate thickness direction of the connecting portion, and each side surface includes a fitting protrusion projecting outward in the second direction. A protective cap includes an end surface covering portion for covering the projecting end surface of the connecting portion and a pair of side surface covering portions, for covering the pair of side surfaces, of the connecting portion. Each side surface covering portion is coupled to the end surface covering portion at a base end part and includes a fitting recess, into which the fitting protrusion is fit. The fitting recess includes a pair of first facing portions, facing the fitting protrusion on both sides in the first direction.

4 Claims, 9 Drawing Sheets

(58) Field of Classification Search
USPC .......................................... 439/886, 135, 149
See application file for complete search history.

(56) References Cited

U.S. PATENT DOCUMENTS

| | | |
|---|---|---|
| 2020/0014140 A1 | 1/2020 | Duenkel et al. |
| 2021/0135387 A1 | 5/2021 | Kobayashi et al. |
| 2021/0257768 A1 | 8/2021 | Shimizu et al. |
| 2022/0029341 A1 | 1/2022 | Kobayashi et al. |

PROTECTIVE CAP-EQUIPPED TERMINAL

CROSS REFERENCE TO RELATED APPLICATIONS

This application is a national phase of PCT application No. PCT/JP2022/011387, filed on 14 Mar. 2022, which claims priority from Japanese patent application No. 2021-052705, filed on 26 Mar. 2021, all of which are incorporated herein by reference.

TECHNICAL FIELD

The present invention relates to a protective cap-equipped terminal.

BACKGROUND

Conventionally, an electric shock prevention structure needs to be provided to prevent an electric shock caused by the touch of fingers, a tool or the like of a worker handling a connector with a terminal fitting in a connector for high voltage used, for example, in a hybrid vehicle, an electric vehicle or the like. For example, Patent Document 1 discloses a protective cap-equipped terminal in which a protective cap for covering the peripheral edge of a tip part of a connecting portion is attached to a terminal including the flat plate-like connecting portion.

PRIOR ART DOCUMENT

Patent Document

Patent Document 1: JP 2019-185932 A

SUMMARY OF THE INVENTION

Problems to be Solved

The protective cap disclosed in Patent Document 1 is integrally provided with a tip covering portion for covering the tip surface of the terminal and a pair of side surface covering portions for covering both side surfaces of the terminal by projecting from both end parts of the tip covering portion. Locking portions to be locked to a housing are provided on projecting end parts of the pair of side surface covering portions, and the protective cap is fixed to the housing with the tip covering portion and the pair of side surface covering portions of the protective cap overlapped on the tip surface and both side surfaces of the terminal. Therefore, if an external force acting in a plate thickness direction of the terminal is applied to the protective cap, there is a conceivable possibility that the protective cap is shifted from the terminal in the plate thickness direction of the terminal and the tip surface and the both side surfaces of the terminals are exposed.

Accordingly, a protective cap-equipped terminal is disclosed which can suppress a position shift of a protective cap with respect to a terminal.

Means to Solve the Problem

The present invention is directed to a protective cap-equipped terminal with a terminal including a flat plate-like and projecting connecting portion and a protective cap to be attached to the connecting portion, the connecting portion of the terminal having a projecting end surface and a pair of side surfaces facing each other in a second direction serving as a plate width direction orthogonal to a first direction serving as a plate thickness direction of the connecting portion, each side surface including a fitting protrusion projecting outward in the second direction, the protective cap including an end surface covering portion for covering the projecting end surface of the connecting portion and a pair of side surface covering portions for covering the pair of side surfaces of the connecting portion, each side surface covering portion being coupled to the end surface covering portion at a base end part and including a fitting recess, the fitting protrusion being fit into the fitting recess, and the fitting recess including a pair of first facing portions facing the fitting protrusion on both sides in the first direction.

Effect of the Invention

According to the present disclosure, it is possible to provide a protective cap-equipped terminal capable of suppressing a position shift of a protective cap with respect to a terminal.

DETAILED DESCRIPTION TO EXECUTE THE INVENTION

Description of Embodiments of Present Disclosure

Figure 1:
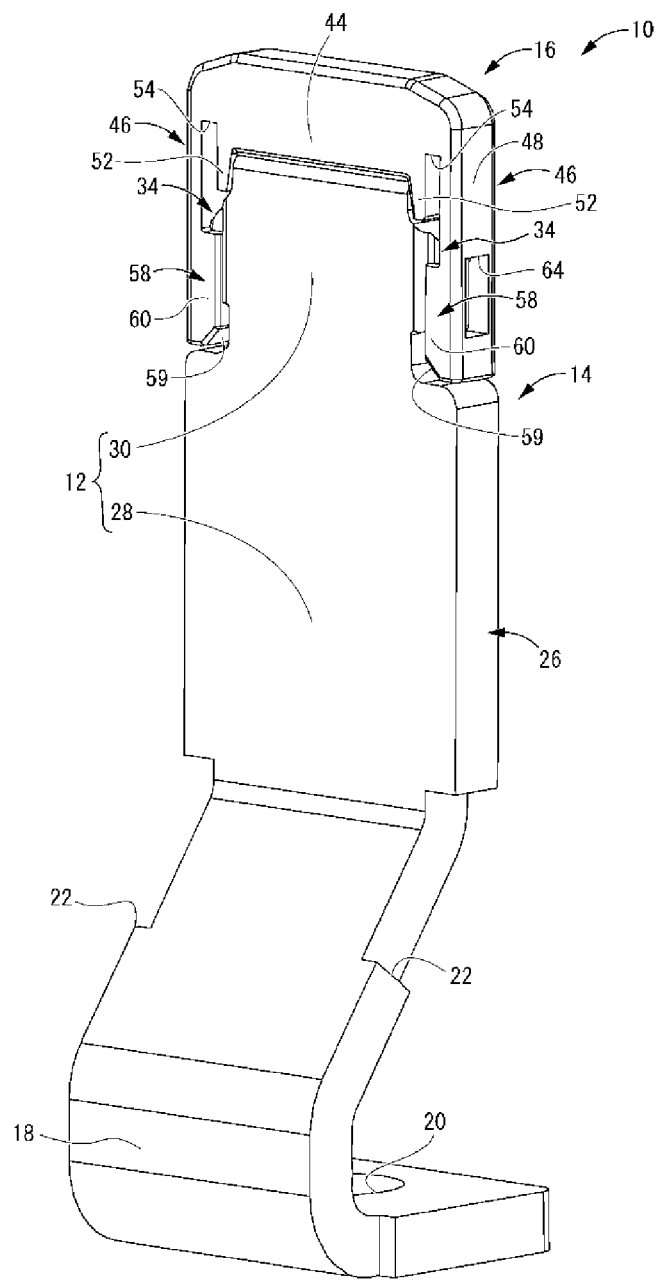
FIG. 1 is an overall perspective view showing a protective cap-equipped terminal according to one embodiment.
Figure 2:
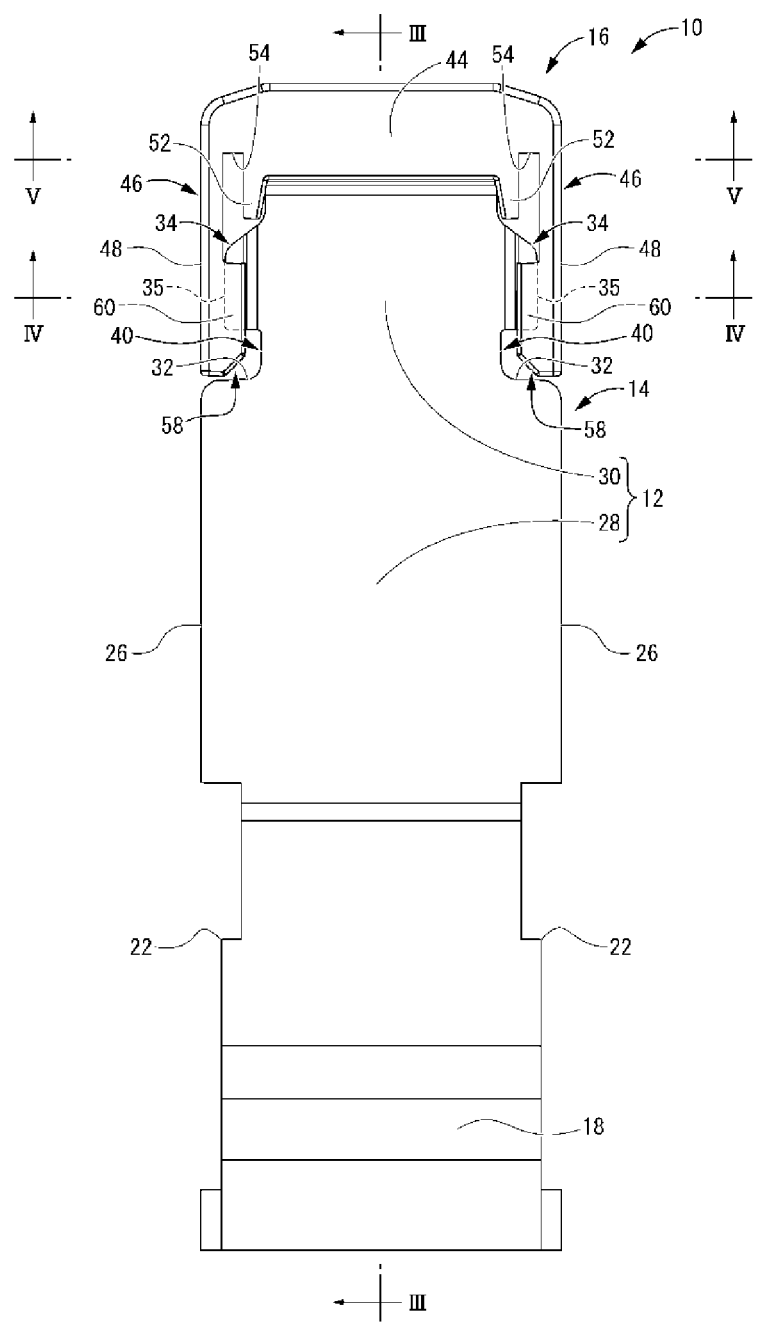
FIG. 2 is a front view of the protective cap-equipped terminal shown in FIG. 1.
Figure 3:
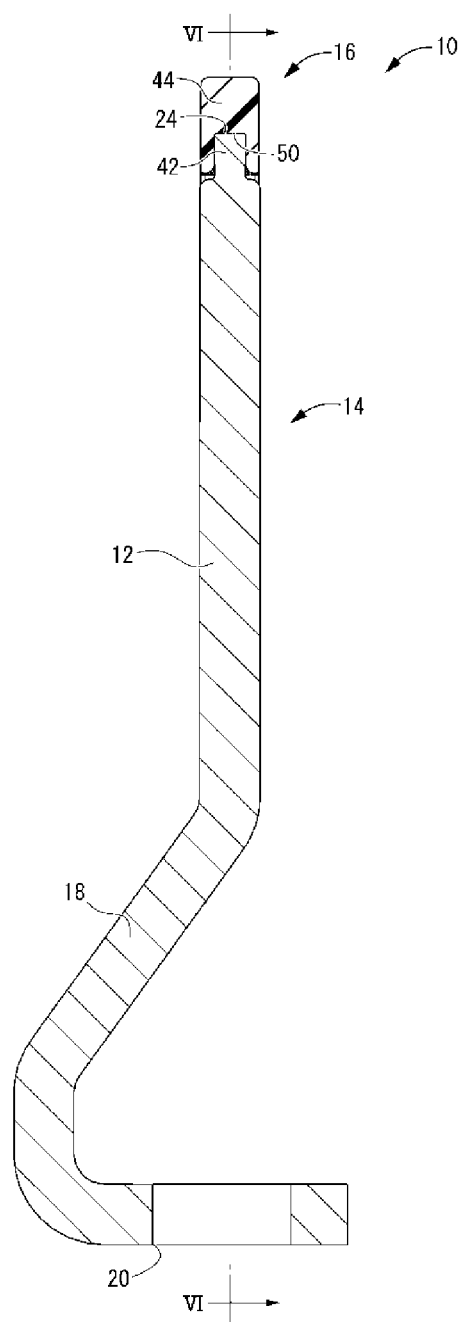
FIG. 3 is a section along in FIG. 2.
Figure 4:
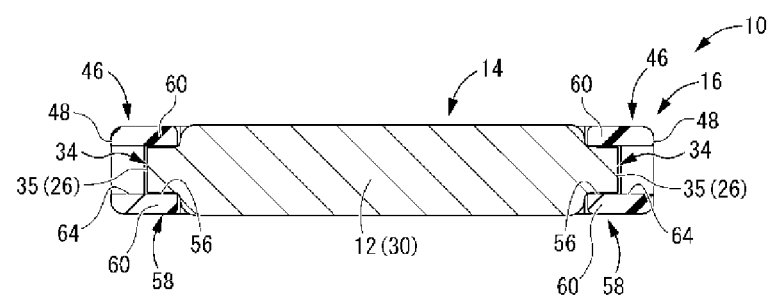
FIG. 4 is a view enlargedly showing a cross-section along IV-IV in FIG. 2.
Figure 5:
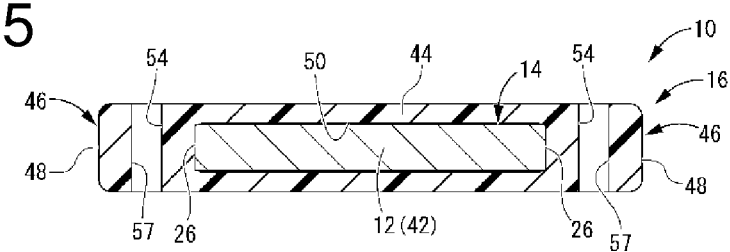
FIG. 5 is a view enlargedly showing a cross-section along V-V in FIG. 2.
Figure 6:
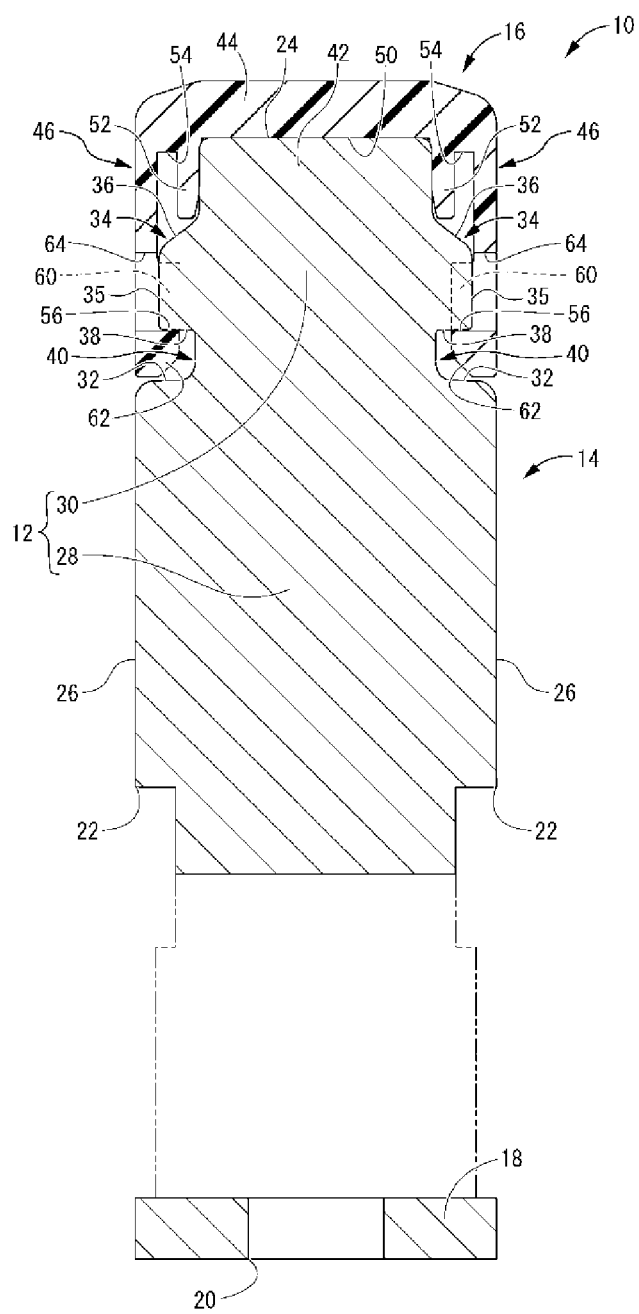
FIG. 6 is a section along VI-VI in FIG. 3.

First, embodiments of the present disclosure are listed and described.

(1) The protective cap-equipped terminal of the present disclosure is provided with a terminal including a flat plate-like and projecting connecting portion and a protective cap to be attached to the connecting portion, the connecting portion of the terminal having a projecting end surface and a pair of side surfaces facing each other in a second direction serving as a plate width direction orthogonal to a first direction serving as a plate thickness direction of the connecting portion, each side surface including a fitting protrusion projecting outward in the second direction, the protective cap including an end surface covering portion for covering the projecting end surface of the connecting portion and a pair of side surface covering portions for covering the pair of side surfaces of the connecting portion, each side surface covering portion being coupled to the end surface covering portion at a base end part and including a fitting recess, the fitting protrusion being fit into the fitting recess, and the fitting recess including a pair of first facing portions facing the fitting protrusion on both sides in the first direction.

According to the protective cap-equipped terminal of the present disclosure, the projecting end surface and the pair of side surfaces of the flat plate-like and projecting connecting portion are respectively covered by the end surface covering portion and the pair of side surface covering portions of the protective cap. In this way, an electric shock caused by the touch of worker's fingers or tool with the projecting end surface of the connecting portion or the side surfaces connected to the projecting end surface can be prevented.

Further, each side surface of the connecting portion includes the fitting protrusion projecting outward in the second direction serving as the plate width direction, and each side surface covering portion of the protective cap for covering the side surface is provided with the fitting recess, into which the fitting protrusion is fit. The fitting recess includes the pair of first facing portions facing the fitting protrusion on the both sides in the first direction serving as the plate thickness direction of the connecting portion. Therefore, even if an external force in the plate thickness direction of the connecting portion of the terminal is applied to the protective cap, a displacement of the protective cap is hindered or suppressed by the contact of the fitting protrusions with the first facing portions of the fitting recesses on the both sides in the first direction. As a result, a position shift of the protective cap with respect to the terminal can be suppressed.

Note that the pair of first facing portions may face the fitting protrusion without any gap therebetween or may face the fitting protrusion across small gaps within such a range that a position shift of the protective cap with respect to the terminal can be suppressed. Further, the fitting recess of the side surface covering portion may be open at least inward in the second direction to accommodate the fitting protrusion provided on the side surface, but may be a through hole open outward in the second direction.

(2) Preferably, the fitting recess includes a second facing portion facing the fitting protrusion from a tip side of the side surface covering portion in a projecting direction of the connecting portion. In this way, even if a force in a pull-out direction is applied to the protective cap when a mating terminal is pulled out, the separation of the protective cap from the connecting portion is hindered or suppressed by the contact of the second facing portions of the fitting recesses with the fitting protrusions. Further, in a conventional structure, a locking portion to be locked to a housing functions to suppress the separation of the protective cap when a pull-out force is applied. In this mode, a pull-out force can be resisted, using the fitting recesses and the fitting protrusions, without separately providing a locking portion, and the structure of the protective cap can be simplified and reduced in size.

(3) Preferably, the connecting portion includes an end surface protrusion projecting forward in the projecting direction of the connecting portion, the end surface covering portion of the protective cap includes an end surface recess open toward the connecting portion to accommodate the end surface protrusion, and the end surface protrusion is facing the end surface recess in the first direction, the second direction and the projecting direction.

Since the end surface protrusion of the connecting portion is accommodated in the end surface recess of the protective cap and facing the end surface recess in the first and second directions, a position shift of the protective cap with respect to the terminal in those two directions can be further suppressed by the contact of the end surface protrusion with the end surface recess. Further, an insertion end position of the connecting portion into the protective cap in a direction opposite to the projecting direction can be made clear by the contact of the end surface protrusion with the end surface recess in the projecting direction. Note that the end surface recess may be facing the end surface protrusion without any gap therebetween or may be facing the end surface protrusion across a small gap in at least one of the first direction, the second direction and the projecting direction of the connecting portion.

(4) In (3) described above, preferably, the end surface covering portion includes a pair of guide projections connected to both end surfaces in the second direction of the end surface recess and extending in an extending direction of the side surface covering portions, and the respective guide projections are facing the respective side surface covering portions located on outer sides in the second direction across gaps in the second direction. The guide projections projecting in the extending direction of the side surface covering portions from the both end surfaces of the end surface recess are provided in the end surface covering portion of the protective cap. In this way, the end surface protrusion is positioned in the end surface recess and assemblability can be improved in assembling the protective cap with the connecting portion of the terminal. Further, since the gaps are provided between the guide projections and the side surface covering portions in the second direction, the side surface covering portions can be easily deflected and deformed in assembling the protective cap with the connecting portion of the terminal while the rigidity of the protective cap is ensured.

Details of Embodiment of Present Disclosure

A specific example of a protective cap-equipped terminal of the present disclosure is described below with reference to the drawings. Note that the present disclosure is not limited to these illustrations, but is represented by claims and intended to include all changes in the scope of claims and in the meaning and scope of equivalents.

Embodiment

Hereinafter, a protective cap-equipped terminal 10 of one embodiment of the present disclosure is described using FIGS. 1 to 12. As shown in FIGS. 1 to 6, the protective cap-equipped terminal 10 includes a terminal 14 having a flat plate-like and projecting connecting portion 12 and a protective cap 16 to be attached to the connecting portion 12. This protective cap-equipped terminal 10 is electrically connected to an unillustrated mating terminal by being overlapped on the mating terminal, for example, in a plate thickness direction of the connecting portion 12. Note that the protective cap-equipped terminal 10 can be arranged in an arbitrary orientation, but an upper side is an upper side in FIG. 2, a lower side is a lower side in FIG. 2, a left side is a left side in FIG. 2, a right side is a right side in FIG. 2, a front side is a left side in FIG. 3 and a rear side is a right side in FIG. 3 in the following description. Further, for a plurality of identical members, only some members may be denoted by a reference sign and the other members may not be denoted by the reference sign.

<Terminal 14>

Figure 7:
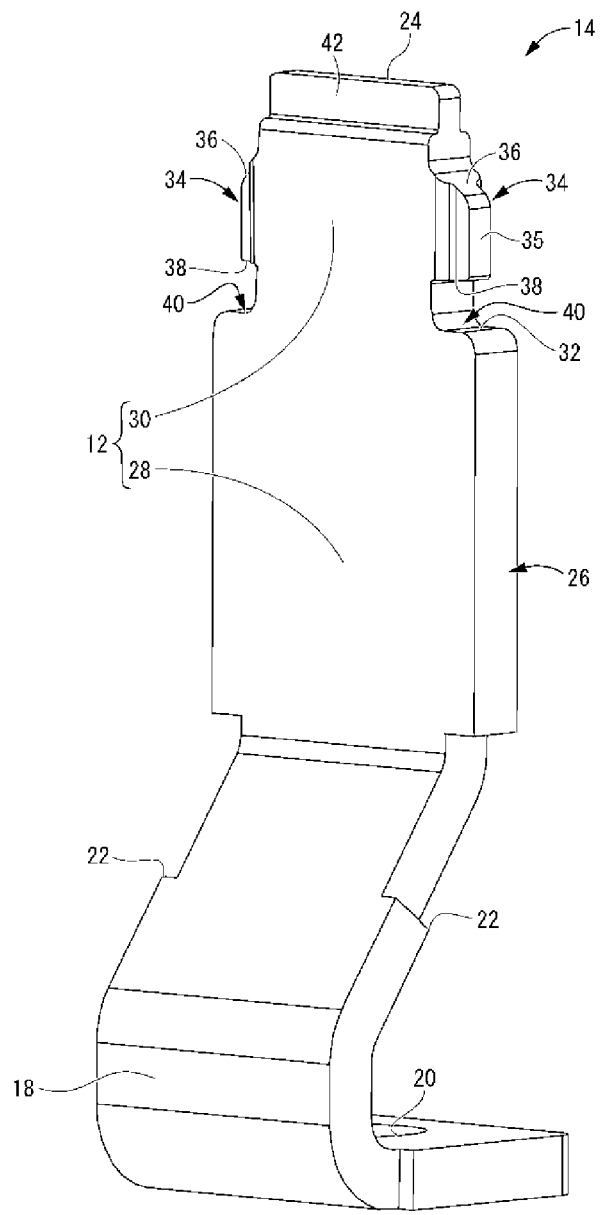
FIG. 7 is a perspective view showing a terminal constituting the protective cap-equipped terminal shown in FIG. 1.
Figure 8:
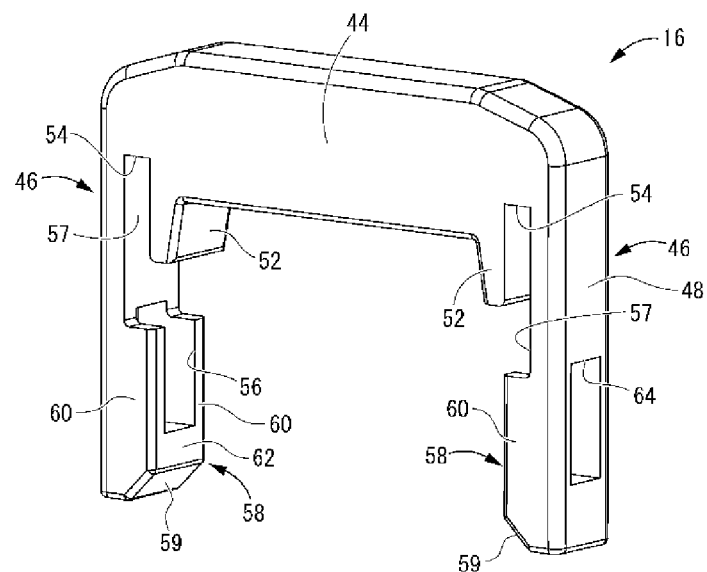
FIG. 8 is a perspective view enlargedly showing a protective cap constituting the protective cap-equipped terminal shown in FIG. 1.
Figure 9:
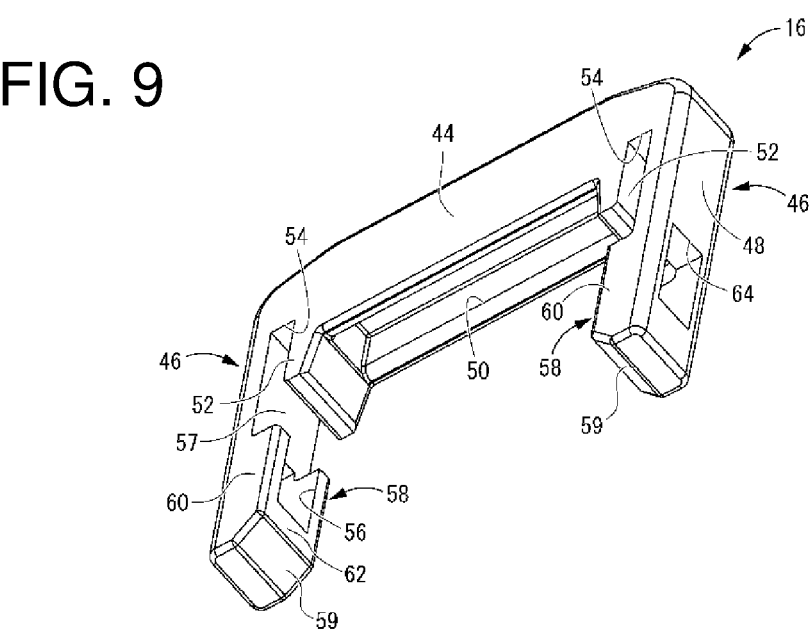
FIG. 9 is a perspective view of the protective cap shown in FIG. 8 viewed from another direction.
Figure 10:
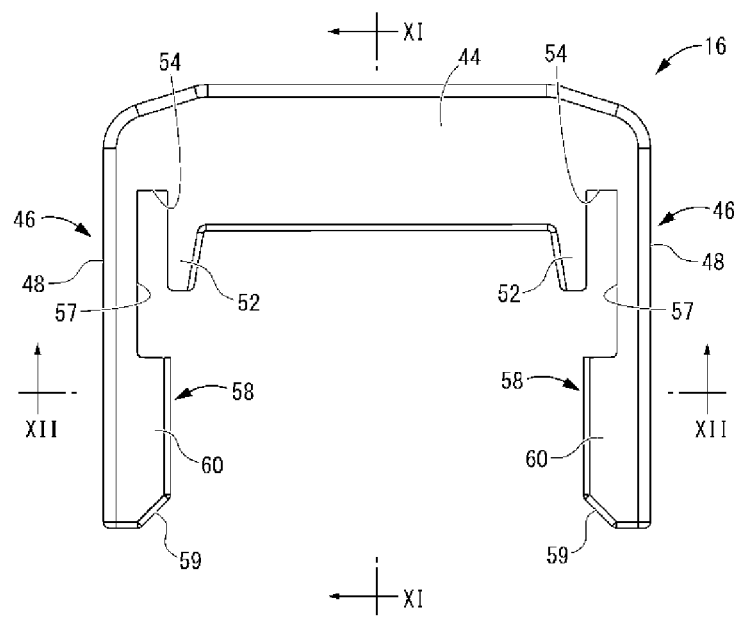
FIG. 10 is a front view of the protective cap shown in FIG. 8.
Figure 11:
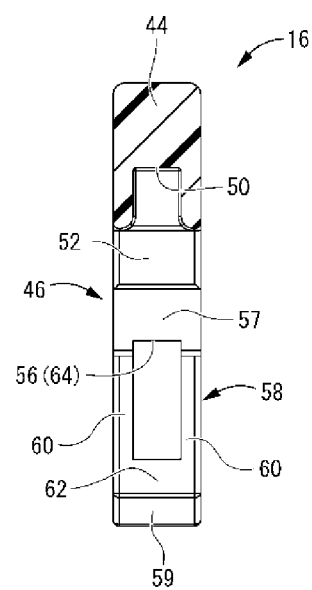
FIG. 11 is a section along XI-XI in FIG. 10.

The terminal 14 is formed by bending a metal flat plate having a substantially constant dimension in a lateral direction as a whole into a predetermined shape and, for example, formed of electrically conductive metal. As also shown in FIG. 7, the terminal 14 is provided with the flat plate-like connecting portion 12 extending in a vertical direction and a fixing portion 18 extending downward continuously from the connecting portion 12. That is, the connecting portion 12 is provided to project upward from the fixing portion 18 located below. A bolt insertion hole 20 is provided in an end part of the fixing portion 18 on a side opposite to the connecting portion 12. The terminal 14 is, for example, fixed to a terminal block of an unillustrated device such as an inverter and connected to a circuit of the device by an unillustrated bolt inserted through this bolt insertion hole 20.

In this embodiment, the fixing portion 18 extends obliquely forward from the lower end of the connecting portion 12, and is folded rearward in a front end part (lower end part). Thus, the lower end part of the fixing portion 18 extends in a front-rear direction, and the bolt insertion hole 20 is provided in this part extending in the front-rear direction. Further, openings 22 open outward in the lateral direction are formed on both sides in the lateral direction in an end part (upper end part) of the fixing portion 18 on the side of the connecting portion 12. The terminal 14 can be fixed to an unillustrated housing or the like, for example, using unillustrated projections or the like to be fit into the openings 22, 22.

As described above, the flat plate-like connecting portion 12 projects upward from below and has predetermined dimensions in the vertical direction, lateral direction and front-rear direction. In the following description, a plate thickness direction (front-rear direction) of the connecting portion 12 may be referred to as a first direction, a plate width direction (lateral direction) of the connecting portion 12 orthogonal to the first direction may be referred to as a second direction, and a projecting direction (down-to-up direction) of the connecting portion 12 orthogonal to the first and second directions may be referred to as a projecting direction. In the connecting portion 12, a tip surface in the projecting direction is a projecting end surface 24, and surfaces on both sides in the second direction are a pair of side surfaces 26, 26 facing each other.

A plate width of the connecting portion 12 is different in the vertical direction, a lower part of the connecting portion 12 is a large-width portion 30 having a large width, and an upper part of the connecting portion 12 is a small-width portion 30 having a small width. That is, step surfaces 32, 32 extending in the lateral direction are formed on both sides in the lateral direction in an intermediate part in the vertical direction of the connecting portion 12. Therefore, the side surfaces 26, 26 of the connecting portion 12 include both lateral side surfaces of the small-width portion 30, the step surfaces 32, 32 and both lateral side surfaces of the large-width portion 28. Further, the projecting end surface 24 of the connecting portion 12 is constituted by the upper end surface of the small-width portion 30.

<Fitting Protrusions 34>

Fitting protrusions 34 projecting outward in the second direction are provided on both side surfaces in the second direction (both lateral side surfaces) of the small-width portion 30 on the respective side surfaces 26. Each fitting protrusion 34 has a substantially trapezoidal shape in a front view shown in FIG. 2, and a projecting tip surface 35 extends in the vertical direction. Further, the upper end surface of each fitting protrusion 34 is an inclined surface 36 inclined downward toward an outer side in the lateral direction. Further, the lower end surface of each fitting protrusion 34 is a horizontal surface 38 extending in the lateral direction. These fitting protrusions 34 respectively project with such a dimension as not to reach the large-width portion 28 in the lateral direction, and the projecting tip surfaces 35 of the respective fitting protrusions 34 are located laterally inwardly of the both lateral side surfaces of the large-width portion 28. Note that since the fitting protrusions 34 are provided on the both lateral side surfaces of the small-width portion 30 on the side surfaces 26, the side surfaces 26, 26 include the projecting tip surfaces 35, the inclined surfaces 36 and the horizontal surfaces 38 of the respective fitting protrusions 34 in addition to the step surfaces 32, 32 and the both lateral side surfaces of the large-width portion 28.

A dimension in the front-rear direction (first direction) of each fitting protrusion 34 is different in a projecting direction (lateral direction) of the fitting protrusion 34, and gradually reduced toward an outer side in the projecting direction in a base end part in the projecting direction of the fitting protrusion 34 and substantially constant in a tip part in the projecting direction. That is, a dimension in the front-rear direction of each fitting protrusion 34 at the projecting tip surface 35 is smaller than that of a part of the small-width portion 30 where the respective fitting protrusions 34 are not provided. A method for forming such fitting protrusions 34 is not limited, but the fitting protrusions 34 can be formed, for example, by reducing a plate thickness (dimension in the front-rear direction) by press-working after parts projecting outward in the lateral direction from the small-width portion 30 are formed to have a plate thickness substantially equal to that of the small-width portion 30.

Further, by providing the fitting protrusions 34 projecting outward in the lateral direction on the small-width portion 30, locking recesses 40, 40 open outward in the lateral direction are formed between the fitting protrusions 34 and the step surfaces 32 in the vertical direction.

<End Surface Protrusion 42>

Further, a dimension in the front-rear direction (first direction) of the small-width portion 30 is different in the vertical direction in a part above the fitting protrusions 34. That is, in the part above and continuous from the fitting protrusions 34, the dimension in the front-rear direction is gradually reduced toward an upper side in a predetermined region in the vertical direction, and is substantially constant in an upper part. A part having a substantially constant dimension in the front-rear direction in an upper end part of the small-width portion 30 is the end surface protrusion 42 projecting forward in the projecting direction of the connecting portion 12 (down-to-up direction), and the projecting end surface 24 of the connecting portion 12 is configured to include the upper end surface of the end surface protrusion 42.

Accordingly, a dimension in the lateral direction of the end surface protrusion 42 is substantially equal to that of the part of the small-width portion 30 where the respective fitting protrusions 34 are not provided. Further, a dimension in the front-rear direction of the projecting end surface 24 is smaller than those of parts of the small-width portion 30 where the respective fitting protrusions 34 and the end surface protrusion 42 are not provided. A method for forming such an end surface protrusion 42 is not limited, but the end surface protrusion 42 can be formed, for example, by reducing a plate thickness (dimension in the front-rear direction) by press-working after the upper end part of the small-width portion 30 is formed to have a substantially constant plate thickness.

<Protective Cap 16>

The protective cap 16 is made of insulating synthetic resin. As also shown in FIGS. 8 to 12, the protective cap 16 includes an end surface covering portion 44 for covering the projecting end surface 24 of the connecting portion 12 and a pair of side surface covering portions 46, 46 for covering the pair of side surfaces 26, 26 in the connecting portion 12. The protective cap 16 has a substantially constant dimension in the front-rear direction as a whole, in this embodiment, substantially equal to that of parts of the large-width portion 28 and the small-width portion 30 in the connecting portion 12 where the respective fitting protrusions 34 and the end surface protrusions 42 are not provided.

The end surface covering portion 44 has a predetermined dimension in the lateral direction, and the pair of side surface covering portions 46, 46 project substantially straight downward from both end parts in the lateral direction of the end surface covering portion 44. In short, projecting base end parts (upper end parts) of the respective side surface covering portions 46 facing each other in the lateral direction are coupled to the end surface covering portion 44. A facing distance between both lateral outer surfaces 48, 48 of the respective side surface covering portions 46 is substantially equal to a separation distance between both lateral outer surfaces of the large-width portion 28 in the connecting portion 12. Further, as described later, gaps 54 are formed laterally inwardly of the respective side surface covering portions 46. Therefore, the side surface covering portions 46 are deflectable and deformable in the lateral direction and, in this embodiment, resiliently deformable in the lateral direction.

<End Surface Recess 50>

Figure 12:
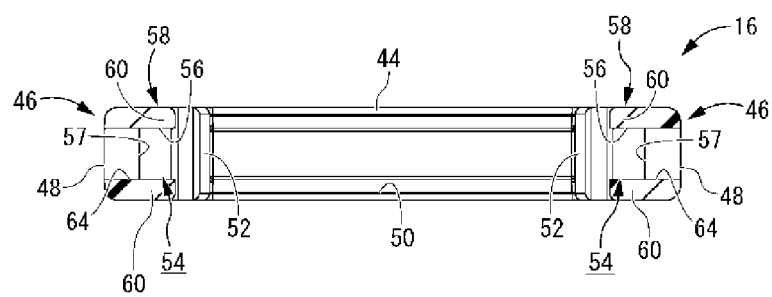
FIG. 12 is a section along XII-XII in FIG. 10.

An end surface recess 50 open downward toward the connecting portion 12 and configured to accommodate the end surface protrusion 42 is formed in the lower end surface of the end surface covering portion 44. The end surface recess 50 is a substantially rectangular recess as also shown in FIG. 12. The size of the end surface recess 50 is not limited, but a dimension in the lateral direction of the end surface recess 50 is substantially equal to or slightly smaller than that of the end surface protrusion 42 in this embodiment. Further, a dimension in the front-rear direction of the end surface recess 50 is substantially equal to or slightly larger than that of the end surface protrusion 42.

Further, a depth (dimension in the vertical direction) of the end surface recess 50 is substantially equal to or slightly smaller than a projecting dimension (dimension in the vertical direction) of the end surface protrusion 42. Accordingly, as described later, the projecting end surface 24 of the connecting portion 12 comes into contact with the upper bottom surface of the end surface recess 50 by inserting the end surface protrusion 42 into a deepest part of the end surface recess 50 when the terminal 14 and the protective cap 16 are assembled. Therefore, an overlapping surface of the end surface covering portion 44 on the projecting end surface 24 is configured to include the upper bottom surface of the end surface recess 50.

<Guide Projections 52>

A pair of guide projections 52, 52 extend downward in an extending direction of the side surface covering portions 46, 46 from the end surface covering portion 44 from wall parts on both sides in the lateral direction constituting the end surface recess 50 on the lower end surface of the end surface covering portion 44. In this embodiment, lateral inner and outer surfaces of the respective guide projections 52 are respectively continuously formed from inner and outer surfaces of the wall parts on the both sides in the lateral direction constituting the end surface recess 50 substantially without any step. In short, the end surface covering portion 44 includes the pair of guide projections 52, 52 connected to both end surfaces in the second direction (lateral direction) of the end surface recess 50 and extending in the extending direction of the side surface covering portions 46.

Particularly, in this embodiment, the lateral outer surfaces of the guide projections 52 are continuous with the outer surfaces of the wall parts on both left and right sides constituting the end surface recess 50 and extend in the vertical direction. Further, the inner surfaces of the guide projections 52 extend gradually obliquely outward in the lateral direction toward a lower side from the lower ends of the inner surfaces of the wall parts on the both left and right sides constituting the end surface recess 50. That is, a facing distance in the lateral direction of the guide projections 52, 52 is gradually increased toward the lower side. The facing distance in the lateral direction of the guide projections 52, 52 largest at the lower ends of the guide projections 52, 52 is larger than the dimension in the lateral direction of the end surface protrusion 42.

Such guide projections 52, 52 are located laterally inwardly of the side surface covering portions 46, 46 on both sides in the lateral direction. In short, the respective guide projections 52 are facing the respective side surface covering portions 46 located on outer sides in the second direction (lateral direction) across the gaps 54 in the second direction. These gaps 54 are respectively formed to penetrate through the protective cap 16 in the front-rear direction. In this way, the respective side surface covering portions 46 are resiliently deformable in the lateral direction. In this embodiment, the upper surfaces of the respective gaps 54 are located below the upper bottom surface of the end surface recess 50.

<Fitting Recesses 56>

Fitting recesses 56, into which the respective fitting protrusions 34 of the connecting portion 12 are fit, are formed in lower end parts, i.e. tip parts in the extending direction, of the respective side surface covering portions 46. In this embodiment, claw-like portions 58 projecting inward from lateral inner surfaces 57 of the respective side surface covering portions 46 are provided on parts of the respective side surface covering portions 46 below the respective guide projections 52. That is, the facing distance in the lateral direction is smaller at positions of the side surface covering portions 46, 46 where the claw-like portions 58, 58 are formed than in parts where the claw-like portions 58, 58 are not formed. A facing distance in the lateral direction of the claw-like portions 58, 58 is smaller than a separation distance in the lateral direction between the projecting tip surfaces 35 of the fitting protrusions 34, 34 of the connecting portion 12. Further, inclined surfaces 59 respectively inclined upward toward an inner side in a facing direction are formed on inner surfaces in the facing direction of the lower ends of the respective claw-like portions 58. The fitting recesses 56 are formed to be open inward in the lateral direction on the respective inner surfaces in the facing direction of these claw-like portions 58, 58.

Accordingly, the fitting recess 56 includes a pair of first facing portions 60, 60 facing the fitting protrusion 34 on both sides in the first direction (front-rear direction) with the fitting protrusion 34 to be described later fit in the fitting recess 56. In this embodiment, a facing distance of the first facing portions 60, 60 is substantially equal to or slightly larger than the dimension in the front-rear direction of the projecting tip surface 35 of each fitting protrusion 34. Further, in this embodiment, the fitting recess 56 is open upward and closed on a lower side. That is, the fitting recess 56 includes a second facing portion 62 coupling the first facing portions 60, 60 in the front-rear direction on the lower side. The second facing portion 62 is facing the fitting protrusion 34 from below, i.e. from the tip side in the extending direction of the side surface covering portion 46 with the fitting protrusion 34 fit in the fitting recess 56 as described later. Further, in this embodiment, each fitting recess 56 communicates with a through hole 64 penetrating through the side surface covering portion 46 in the lateral direction, and this through hole 64 is open in the lateral outer surface 48 of the side surface covering portion 46. By shaping the fitting recesses 56 to be open outward through the through holes 64, the fitting recesses 56 can be easily formed when the protective cap 16 is molded.

<Attachment of Protective Cap 16 to Terminal 14>

To attach the protective cap 16 to the connecting portion 12 of the terminal 14, the terminal 14 and the protective cap 16 are first opposed to each other in the vertical direction and brought closer to each other. In this way, the inclined surfaces 36, which are the upper end surfaces of the respective fitting protrusions 34 in the connecting portion 12 of the terminal 14, and the inclined surfaces 59 provided on the lower end surfaces of the respective side surface covering portions 46 in the protective cap 16 are brought into contact and the respective side surface covering portions 46 are resiliently deformed to be pushed and expanded outward in the facing direction.

Then, the terminal 14 and the protective cap 16 are brought further closer to each other, and the end surface protrusion 42, which is the upper end of the terminal 14, is inserted into the end surface recess 50 provided in the end surface covering portion 44 of the protective cap 16. As a result, the end surface protrusion 42 and the inner surface of the end surface recess 50 face in the first direction (front-rear direction) and the second direction (lateral direction). Further, the projecting end surface 24 of the end surface protrusion 42 and the upper bottom surface of the end surface recess 50 face in the projecting direction (down-to-up direction) of the connecting portion 12.

In this embodiment, the both lateral side surfaces of the end surface protrusion 42 are in contact with the both lateral side surfaces of the inner surface of the end surface recess 50, and the both side surfaces in the front-rear direction of the end surface protrusion 42 are slightly separated from the both side surfaces in the front-rear direction of the inner surface of the end surface recess 50. That is, in this embodiment, the end surface protrusion 42 is inserted substantially press-fit into the end surface recess 50. Further, with the end surface protrusion 42 inserted to the deepest part of the end surface recess 50, the projecting end surface 24 of the end surface protrusion 42 and the upper bottom surface of the end surface recess 50 are in contact with each other. As just described, by inserting the end surface protrusion 42 into the end surface recess 50, position shifts of the terminal 14 and the protective cap 16 are less likely to occur, and the protective cap 16 can be easily attached to the connecting portion 12.

If the terminal 14 and the protective cap 16 are brought further closer with the end surface protrusion 42 inserted in the end surface recess 50, the second facing portions 62 of the respective fitting recesses 56 ride over the respective fitting protrusions 34, the respective side surface covering portions 46 are resiliently restored and the respective second facing portions 62 enter the respective locking recesses 40 of the terminal 14. In this way, the respective fitting protrusions 34 are fit into the respective fitting recesses 56. As a result, the respective first facing portions 60 of the fitting recesses 56 face the fitting protrusions 34 in the first direction, and the second facing portions 62 face the protrusions 34 in the vertical direction. In this embodiment, the fitting protrusions 34 and the respective first facing portions 60 face each other with a small separation distance in the front-rear direction.

Particularly, in this embodiment, only a part having a substantially constant dimension in the front-rear direction in each fitting protrusion 34 is fit into the fitting recess 56, and the projecting tip surface 35 of the fitting protrusion 34 is located laterally inwardly of the lateral outer surface 48 of the side surface covering portion 46. Specifically, the projecting tip surface 35 of each fitting protrusion 34 is substantially at the same position in the lateral direction as the lateral inner surface 57 of each side surface covering portion 46. That is, each fitting protrusion 34 is not exposed on the lateral outer surface 48 of each side surface covering portion 46, thereby preventing a worker from accidentally touching the fitting protrusion 34 from an outer side in the lateral direction and getting an electrical shock.

Further, the respective second facing portions 62 enter the respective locking recesses 40, and the second facing portions 62 and the horizontal surfaces 38 of the fitting protrusions 34 are facing in contact with or slightly apart from each other in the vertical direction. That is, the second facing portions 62 are locked in the locking recesses 40 and in contact with the fitting protrusions 34, whereby an upward displacement of the protective cap 16 with respect to the terminal 14 is prevented. Therefore, in the claw-like portions 58 of the respective side surface covering portions 46, the second facing portions 62 function as locking claws to be substantially locked into the locking recesses 40.

In this way, the protective cap 16 is attached to the connecting portion 12 of the terminal 14 and the protective cap-equipped terminal 10 of this embodiment is completed. With the protective cap 16 attached to the connecting portion 12, the end surface protrusion 42 having the projecting end surface 24 is accommodated in the end surface recess 50 and the both lateral side surfaces of the small-width portion 30 are covered by the side surface covering portions 46, 46 on the side surfaces 26, 26 of the connecting portion 12. Such a protective cap-equipped terminal 10 is accommodated and arranged, for example, in a housing of an unillustrated device and, by inserting the mating terminal into this housing, the terminals are electrically connected.

According to the protective cap-equipped terminal 10 of this embodiment, the projecting end surface 24 and the both side surfaces 26, 26 of the connecting portion 12 are covered by the protective cap 16. In this way, even if the projecting end surface and the both side surfaces of the terminal are exposed, for example, with the terminal accommodated in the housing, a worker can be prevented from accidentally touching the projecting end surface and/or the both side surfaces of the terminal and getting an electrical shock.

The respective fitting protrusions 34 of the connecting portion 12 are fit in the fitting recesses 56 of the protective cap 16 and facing the respective first facing portions 60 in the fitting recesses 56 in the first direction (front-rear direction). In this way, a displacement of the protective cap 16 in the plate thickness direction (first direction) with respect to the terminal 14 is prevented by the contact of the respective fitting protrusions 34 with the respective first facing portions 60. Particularly, since the respective first facing portions 60 provided in a lower end part of the protective cap 16 are facing the respective fitting protrusions 34 in the first direction, a swing displacement of the protective cap 16 centered on an inserted part of the end surface protrusion 42 in the end surface recess 50 in an upper end part of the protective cap 16 can be effectively prevented.

With the protective cap 16 attached to the connecting portion 12, the second facing portions 62 of the protective cap 16 are facing the respective fitting protrusions 34 from below (from the tip sides of the side surface covering portions 46). In this way, even if an external force is applied to the protective cap 16 in a removal direction (upward), accidental detachment of the protective cap 16 from the connecting portion 12 can be avoided by the contact of the respective fitting protrusions 34 and the respective second facing portions 62. Since the terminal 14 and the protective cap 16 are structured to be engaged with each other in this embodiment, a locking portion to the housing needs not be provided, for example, on the protective cap and the structure of the protective cap can be simplified and reduced in size.

The connecting portion 12 includes the end surface protrusion 42, the protective cap 16 includes the end surface recess 50, and the end surface protrusion 42 is accommodated into the end surface recess 50 in attaching the protective cap 16 to the connecting portion 12. In this way, the end surface protrusion 42 and the end surface recess 50 are facing each other in the first direction, the second direction and the projecting direction of the connecting portion 12. As a result, position shifts of the connecting portion 12 and the protective cap 16 in these directions are more reliably prevented by the contact of the end surface protrusion 42 and the end surface recess 50 in the first direction and/or second direction. In this embodiment, the end surface protrusion 42 and the end surface recess 50 are in contact with each other in the second direction with the protective cap 16 attached to the connecting portion 12, and the end surface protrusion 42 is inserted substantially press-fit into the end surface recess 50. In this way, each fitting protrusion 34 can be fit into the fitting recess 56 with the connecting portion 12 and the protective cap 16 positioned to each other in the second direction. Further, any further displacement of the protective cap in an approaching direction toward the connecting portion 12 can be limited by the contact of the end surface protrusion 42 and the end surface recess 50 in the vertical direction.

The pair of guide projections 52, 52 extend from the wall parts on the both sides in the second direction of the end surface recess 50. In this way, the both sides in the lateral direction of the end surface protrusion 42 can be guided into the end surface recess 50 by being brought into contact with the inner surfaces of the respective guide projections 52 in inserting the end surface protrusion 42 into the end surface recess 50. As a result, the insertion of the end surface protrusion 42 into the end surface recess 50 is facilitated and, consequently, the attachment of the protective cap 16 to the connecting portion 12 can be facilitated. Further, the gaps 54 are respectively provided between the respective guide projections 52 and the respective side surface covering portions 46 in the second direction. In this way, the respective side surface covering portions 46 can be deflected and deformed (resiliently deformed) in the second direction. Since the upper surfaces of the respective gaps are located below the upper bottom surface of the end surface recess 50 in this embodiment, the rigidity of coupling parts of the end surface covering portion 44 and the respective side surface covering portions 46 can be ensured.

Modifications

Although the embodiment has been described in detail as a specific example of the present disclosure above, the present disclosure is not limited to this specific description. The present disclosure includes modifications, improvements and the like within a range in which the aim of the present disclosure can be accomplished. For example, the following modifications of the embodiment are also included in the technical scope of the present disclosure.

(1) Although the projecting tip surface 35 of the fitting protrusion 34 is substantially at the same position in the lateral direction as the lateral inner surface 57 of the side surface covering portion 46 with the protective cap 16 attached to the connecting portion 12 in the above embodiment, the projecting tip surface of the fitting protrusion may be located laterally outwardly of the lateral inner surface of the side surface covering portion. That is, the fitting protrusion may enter the through hole penetrating through the side surface covering portion in the lateral direction. In this case, since the fitting protrusions are locked to upper parts of the inner surfaces of the through holes, the protective cap is prevented from being pulled off from the terminal. Therefore, in such a case, the second facing portions in the fitting recesses functioning as the locking claws and the locking recesses to be locked to the locking claws may not be provided. Further, also in such a case, the fitting protrusions are suitably not exposed on the lateral outer surfaces of the side surface covering portions. For example, preferably, the projecting tip surfaces of the fitting protrusions are located laterally inwardly of the lateral outer surfaces of the side surface covering portions and the openings in the lateral outer surfaces of the side surface covering portions are closed. That is, although the fitting recesses 56 communicate with the through holes 64 penetrating through the side surface covering portions 46 in the lateral direction in the above embodiment, the through holes 64 may not be provided and the fitting recesses may be bottomed recesses by closing the openings open outward in the lateral direction.

(2) Although the second facing portions 62 functioning as the locking claws to be locked into the locking recesses 40 are provided in the fitting recesses 56 and close the fitting recesses 56 from below in the above embodiment, parts functioning as the locking claws may be provided separately from the fitting recesses. That is, the locking claws to be locked into the locking recesses may be, for example, provided below the fitting recesses and the fitting recesses may be open on both sides in the vertical direction.

(3) Although the end surface protrusion 42 and the end surface recess 50 are in contact with each other in the second direction and the end surface protrusion 42 is inserted substantially press-fit in the end surface recess 50 with the protective cap 16 attached to the connecting portion 12 in the above embodiment, the end surface protrusion and the end surface recess may not be in contact with each other in both the first and second directions and the end surface protrusion may be inserted with a play into the end surface recess. Even in such a case, since a position shift of the protective cap with respect to the terminal is prevented by the contact of a wall part constituting the end surface recess and the end surface protrusion, the fitting protrusions can be fit into the fitting recesses with the end surface protrusion inserted in the end surface recess and the terminal and the protective cap positioned to a certain extent. Note that the end surface protrusion and the end surface recess are not essential, and the upper end surface of the small-width portion may come into contact with the lower end surface of the end surface covering portion.

(4) Although the pair of side surface covering portions 46, 46 project substantially straight downward from the end surface covering portion 44 in the above embodiment, the side surface covering portions may be, for example, inclined inward in the facing direction in a single state before being attached to the terminal and the side surface covering portions may be pushed and expanded outward in the facing direction in attaching the protective cap to the connecting portion. In this way, in attaching the protective cap to the connecting portion, resilient restoring forces of the side surface covering portions can be applied as biasing forces to the connecting portion from both sides in the lateral direction, and the connecting portion can be more firmly held by the pair of side surface covering portions.

(5) Although the fitting protrusion 34 and the respective first facing portions 60 are slightly separated in the first direction with the protective cap 16 attached to the connecting portion 12 in the above embodiment, the fitting protrusion and the respective first facing portions may be in contact with each other in the first direction and the fitting protrusion may be substantially press-fit into the fitting recess in fitting the fitting protrusion into the fitting recess.

LIST OF REFERENCE NUMERALS 10 protective cap-equipped terminal
12 connecting portion
14 terminal
16 protective cap
18 fixing portion
20 bolt insertion hole
22 opening
24 projecting end surface
26 side surface
28 large-width portion
30 small-width portion
32 step surface
34 fitting protrusion
35 projecting tip surface
36 inclined surface
38 horizontal surface
40 locking recess
42 end surface protrusion
44 end surface covering portion
46 side surface covering portion
48 lateral inner surface
50 end surface recess
52 guide projection
54 gap
56 fitting recess
57 lateral inner surface
58 claw-like portion
59 inclined surface
60 first facing portion
62 second facing portion
64 through hole

What is claimed is:

1. A protective cap-equipped terminal, comprising:
a terminal including a flat plate-like and projecting connecting portion; and
a protective cap to be attached to the connecting portion,
the connecting portion of the terminal having a projecting end surface and a pair of side surfaces facing each other in a second direction serving as a plate width direction orthogonal to a first direction serving as a plate thickness direction of the connecting portion, each side surface including a fitting protrusion projecting outward in the second direction,
the protective cap including an end surface covering portion for covering the projecting end surface of the connecting portion and a pair of side surface covering portions for covering the pair of side surfaces of the connecting portion, each side surface covering portion being coupled to the end surface covering portion at a base end part and including a fitting recess, the fitting protrusion being fit into the fitting recess,
the fitting recess including a pair of first facing portions facing the fitting protrusion on both sides in the first direction, and
each side surface covering portion being provided with a through hole penetrating in the second direction, the fitting recess being open outward through the through hole.

2. The protective cap-equipped terminal of claim 1, wherein the fitting recess includes a second facing portion facing the fitting protrusion from a tip side of the side surface covering portion in a projecting direction of the connecting portion.

3. The protective cap-equipped terminal of claim 1, wherein:
the connecting portion includes an end surface protrusion projecting forward in the projecting direction of the connecting portion,
the end surface covering portion of the protective cap includes an end surface recess open toward the connecting portion to accommodate the end surface protrusion, and
the end surface protrusion is facing the end surface recess in the first direction, the second direction and the projecting direction.

4. The protective cap-equipped terminal of claim 3, wherein:
the end surface covering portion includes a pair of guide projections connected to both end surfaces in the second direction of the end surface recess and extending in an extending direction of the side surface covering portions, and
the respective guide projections are facing the respective side surface covering portions located on outer sides in the second direction across gaps in the second direction.

* * * * *